(12) United States Patent
Levola et al.

(10) Patent No.: US 8,194,325 B2
(45) Date of Patent: Jun. 5, 2012

(54) OPTICAL APPARATUS AND METHOD

(75) Inventors: Tapani Levola, Tampere (FI); Pasi Saarikko, Espoo (FI)

(73) Assignee: Nokia Corporation, Espoo (FI)

( * ) Notice: Subject to any disclaimer, the term of this patent is extended or adjusted under 35 U.S.C. 154(b) by 289 days.

(21) Appl. No.: 12/494,719

(22) Filed: Jun. 30, 2009

(65) Prior Publication Data

US 2010/0328794 A1  Dec. 30, 2010

(51) Int. Cl.
*G02B 27/14* (2006.01)
*G02B 5/18* (2006.01)

(52) U.S. Cl. .................. 359/630; 359/569; 359/633

(58) Field of Classification Search .............. 359/15, 359/566, 569, 571, 576, 630, 633
See application file for complete search history.

(56) References Cited

U.S. PATENT DOCUMENTS 5,701,132 A * 12/1997 Kollin et al. .............. 345/8
RE39,643 E * 5/2007 Kelly ...................... 359/633
2005/0237615 A1* 10/2005 Urey et al. ............... 359/566
2008/0136742 A1* 6/2008 Tegreene et al. ........... 345/7
2010/0271698 A1* 10/2010 Kessler ................... 359/479

FOREIGN PATENT DOCUMENTS

| EP | 0535402 A1 | 4/1993 |
| WO | 9952002 A1 | 10/1999 |
| WO | 2003032017 A3 | 4/2003 |
| WO | 2008014827 A1 | 12/2008 |

OTHER PUBLICATIONS

Inernational Search Report and Written Opinion with mail date of Oct. 14, 2010.
"Diffractive optics for virtual reality displays" by T. Levola, Journal of the SID 14/5, 2006, figure 1; whole document.

* cited by examiner

*Primary Examiner* — Stephone Allen
*Assistant Examiner* — Kimberly N Kakalec
(74) *Attorney, Agent, or Firm* — Harrington & Smith

(57) ABSTRACT

An apparatus and a method are provided. The apparatus including: a light expander configured to expand light, input into the light expander, in a first dimension, and configured to provide diverging light that diverges in the first dimension; and an optical device configured to redirect diverging light, received from the light expander, to produce converging light that converges in the first dimension.

19 Claims, 10 Drawing Sheets

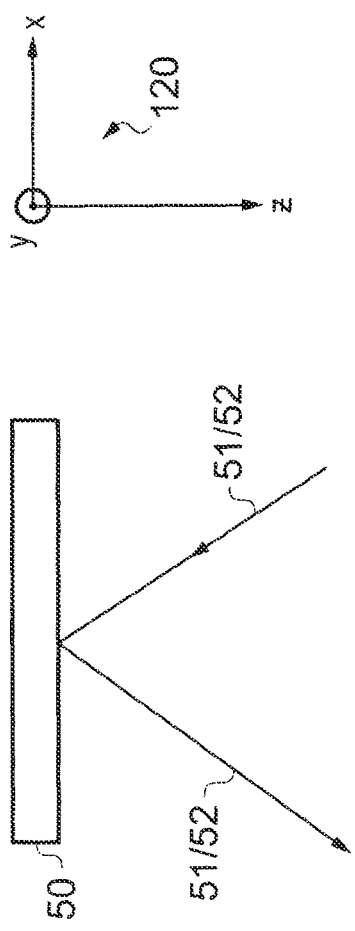
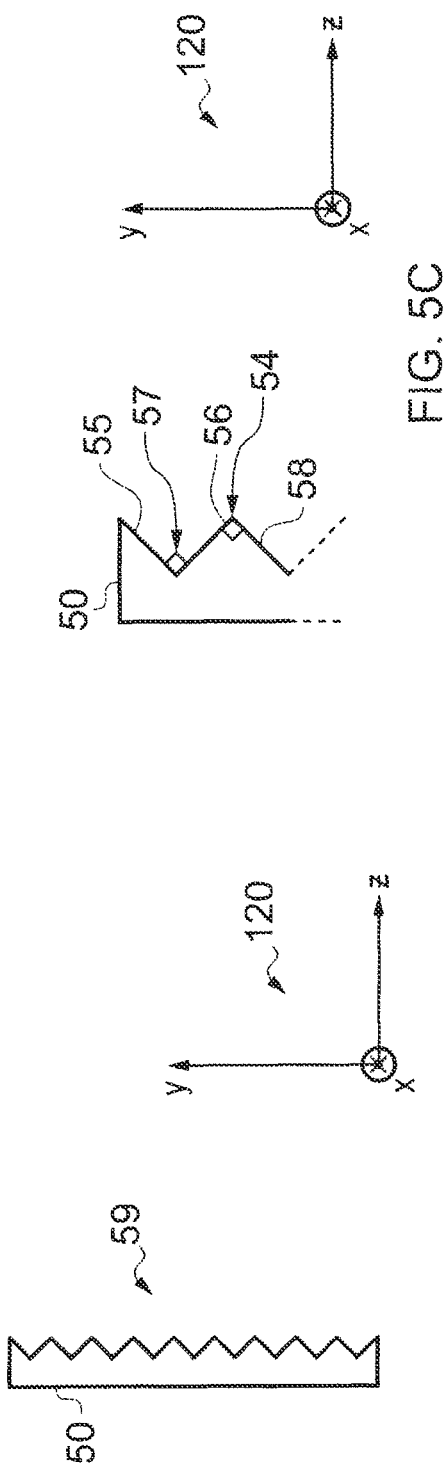
FIG. 5A
FIG. 5B
FIG. 5C

OPTICAL APPARATUS AND METHOD

BACKGROUND

Field

The disclosed embodiments relate to an optical apparatus and method. In particular, they relate to expanding and directing light to enable a user to view an image on a virtual display.

A portable electronic device may include a display that enables a user to view content, such as images or video. The display may be situated on a face of the device. Typically, the size of the display is restricted by a need to keep the size of the portable device relatively small.

BRIEF DESCRIPTION OF THE DISCLOSED EMBODIMENTS

According to various, but not necessarily all of the disclosed embodiments, there is provided an apparatus, comprising: a light expander configured to expand light, input into the light expander, in a first dimension, and configured to provide diverging light that diverges in the first dimension; and an optical device configured to redirect diverging light, received from the light expander, to produce converging light that converges in the first dimension.

The light expander may be configured to guide light, input into the light expander, prior to providing diverging light to the optical device.

The light expander may be configured to expand light, input into the light expander, in the first dimension and not in a second dimension, the second dimension being substantially orthogonal to the first dimension.

The optical device may be configured to redirect diverging light, received from the light expander, to produce converging light that converges in the first dimension and not in a second dimension, the second dimension being substantially orthogonal to the first dimension.

The optical device may be configured to redirect the diverging light within a plane substantially orthogonal to the first dimension. The optical device may comprise a reflecting system comprising a plurality of reflecting surfaces. Adjacent reflecting surfaces of the reflecting system may be orthogonal to one another. The reflecting system may be provided by a grooved reflector. The light input into the light expander may represent an image displayed on a display.

The apparatus may further comprise a further light expander. The further light expander may be configured to expand the light, converging in the first dimension and received from the optical device, in a second dimension substantially orthogonal to the first dimension.

The further light expander may comprise an in-coupling portion configured to receive the converging light from the optical device, and an out-coupling portion configured to output light to a user. The in-coupling portion of the further light expander may comprise a first grating and the out-coupling portion of the further light expander may comprise a second grating. The further light expander may provide an exit pupil for the apparatus.

According to various, but not necessarily all of the disclosed embodiments, there is provided a method, comprising: expanding light in a first dimension; providing diverging light, that diverges in the first dimension; and redirecting the diverging light to produce converging light that converges in the first dimension.

The light may be expanded in the first dimension and not in a second dimension, the second dimension being substantially orthogonal to the first dimension.

The diverging light may be redirected to produce converging light that converges in the first dimension and not in a second dimension, the second dimension being substantially orthogonal to the first dimension.

The method may further comprise expanding the converging light in a second dimension, substantially orthogonal to the first dimension.

According to various, but not necessarily all of the disclosed embodiments, there is provided an apparatus, comprising: light expanding means for expanding light, in a first dimension, and for providing diverging light that diverges in the first dimension; and redirecting means for redirecting diverging light, received from the light expanding means, to produce converging light that converges in the first dimension.

The light expanding means may be for expanding light, input into the light expander, in the first dimension and not in a second dimension, the second dimension being substantially orthogonal to the first dimension.

The redirecting means may be for redirecting diverging light, received from the light expander, to produce converging light that converges in the first dimension and not in a second dimension, the second dimension being substantially orthogonal to the first dimension.

BRIEF DESCRIPTION OF THE DRAWINGS

For a better understanding of various examples of the disclosed embodiments reference will now be made by way of example only to the accompanying drawings in which:

FIG. 5A illustrates an overhead view of the optical device;

FIG. 5B illustrates a side view of the optical device;

FIG. 5C illustrates a portion of a side view of the optical device;

DETAILED DESCRIPTION OF THE EMBODIMENTS

The description and the figures relate to an apparatus 2, comprising: a light expander 30 configured to expand light, input into the light expander, in a first dimension, and configured to provide diverging light that diverges in the first dimension; and an optical device 50 configured to redirect diverging light, received from the light expander 30, to produce converging light that converges in the first dimension.

Figure 1:
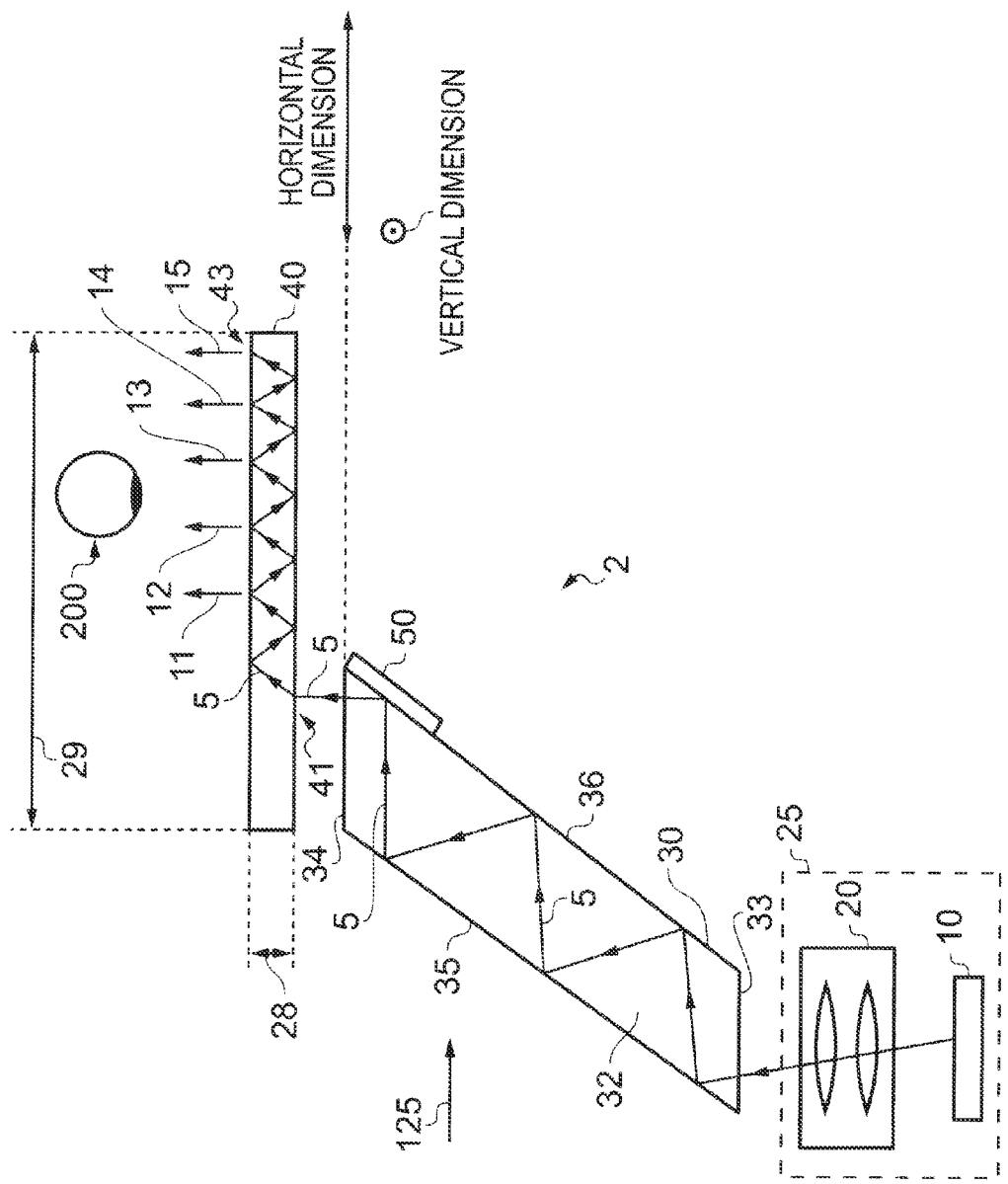
FIG. 1 illustrates an overhead view of optical apparatus.

FIG. 1 illustrates an overhead view of an exemplary optical apparatus 2. In this example, the optical apparatus 2 comprises an optical engine 25, a first light expander 30, an optical device 50 and a second light expander 40.

The optical engine 25 illustrated in FIG. 1 comprises a display 10 and one or more optical devices 20. The display 10 may be any suitable display device and may, for example, be a micro-display. The display 10 may comprise a plurality of pixels. If the display 10 is a micro-display, it may comprise pixels at more than fifty lines per millimeter. The display 10 may, for example, be emissive, transmissive, reflective or transflective. The one or more optical devices 20 may be any suitable optical devices. For example, the one or more optical devices 20 may be one or more lenses.

Divergent light may emanate from each pixel on the display 10. In this example, at least a portion of the divergent light emanating from a pixel is collimated by the one or more optical devices 20 and output from the optical engine 25 as a collimated light beam. The optical engine 25 may, for instance, output a light beam for each and every one of the pixels of the display 10. Each light beam may have a diameter that is substantially equal to the exit aperture of the optical engine 25.

Each one of the light beams output by the optical engine 25 can be considered to comprise a bundle of light rays. The light rays within a particular light beam are substantially parallel to one another.

In this example, the light beams output by the optical engine 25 diverge from one another. That is, the light rays from one light beam diverge from the light rays from another light beam.

The diverging light beams output by the optical engine 25 can be considered to form a continuum of diverging light. The continuum of diverging light exiting the optical engine 25 enters the light expander 30 through an entrance face 33 of the light expander 30.

Figure 2B:
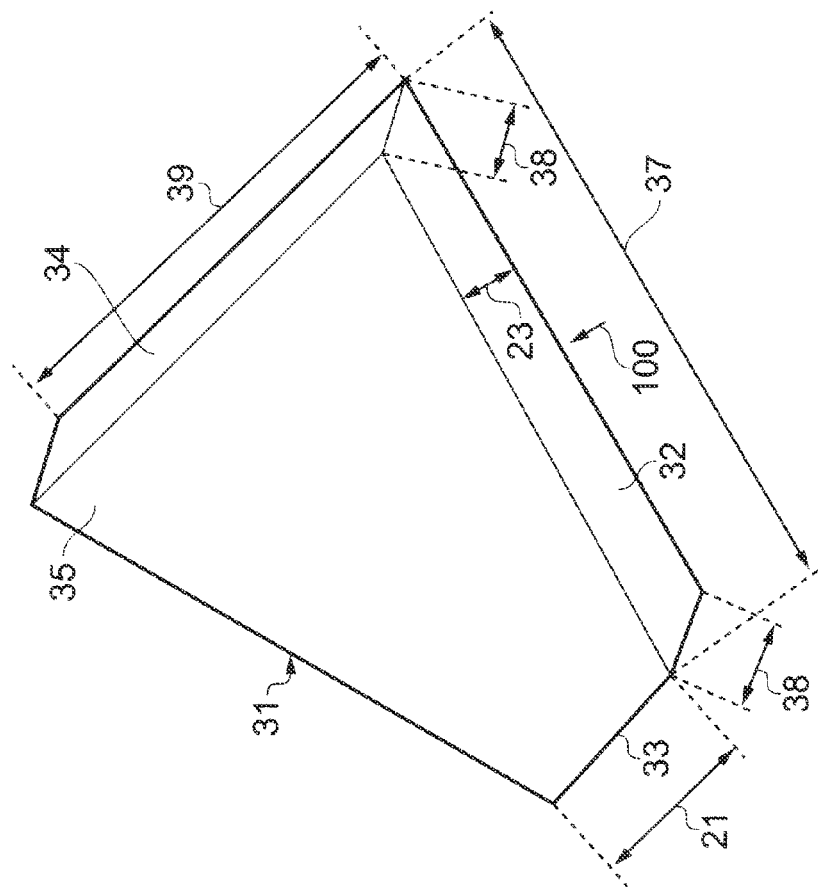
FIG. 2B illustrates a perspective view of the light expander.
Figure 2A:
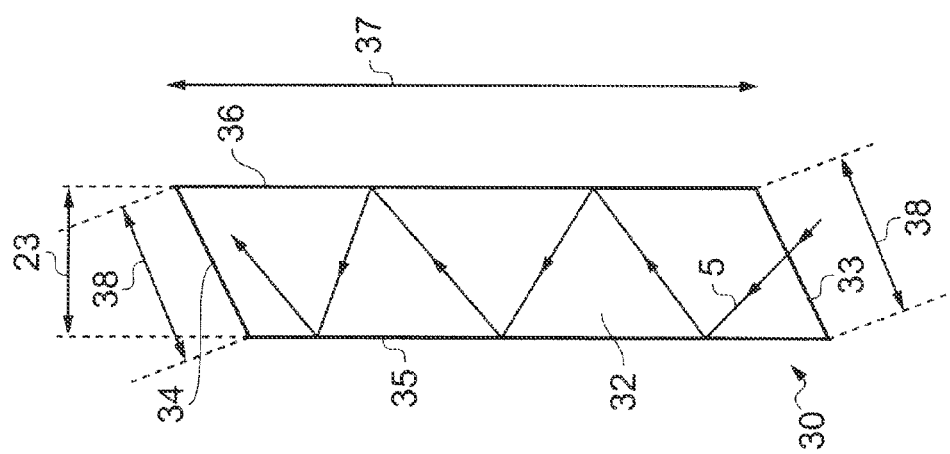
FIG. 2A illustrates an overhead view of a light expander.
Figure 2C:
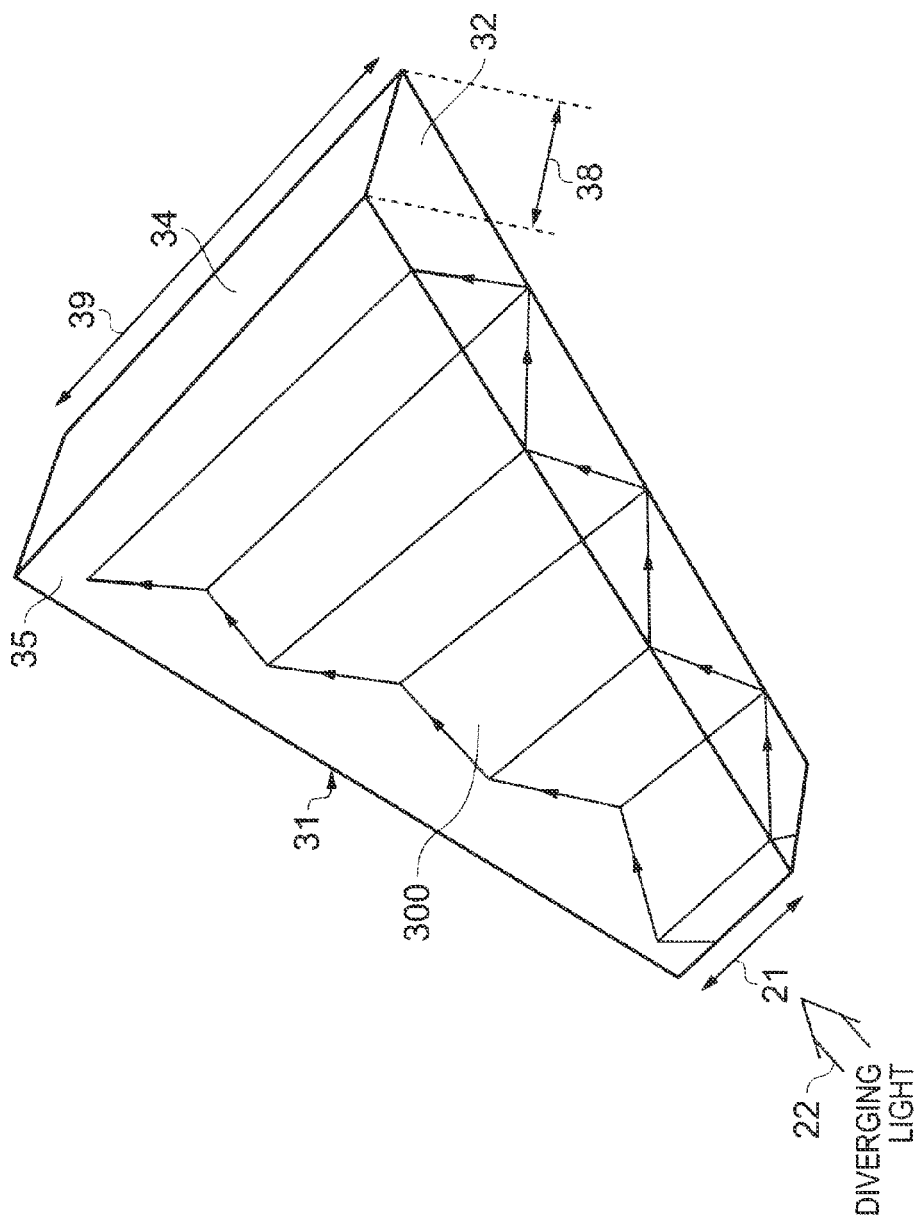
FIG. 2C illustrates a portion of a light beam being expanded in the light expander.

The light expander 30 is illustrated in FIGS. 2A, 2B and 2C. FIG. 2A is an overhead view of the light expander 30 and FIGS. 2B and 2C are perspective views of the light expander 30. The arrow 100 in FIG. 2B illustrates the viewpoint illustrated in FIG. 2A.

The light expander 30 illustrated in FIGS. 2A, 2B and 2C comprises an entrance face 33, an end face 34, an upper face 32, a lower face 31 and first and second side faces 35, 36. In this example, the length 21 of the entrance face 33 is smaller than the length 39 of the end face 33. The widths 38 of the entrance face 33 and the end face 34 are substantially the same.

In this example, the entrance face 33 and the end face 34 are substantially parallel with one another and the first and second side faces 35, 36 are substantially parallel with one another. The lower face 31 and the upper face 32 may or may not be substantially parallel with one another.

As the two side faces 35, 36 extend from the entrance face 33 towards the end face 34, they diverge from one another. In this example, the lengths 37 of the upper and lower faces 31, 32 are substantially the same and the widths 23 of the upper and lower faces 31, 32 are substantially the same.

The diverging light continuum output by the optical engine 25 enters the light expander 30 via the entrance face 33. The light continuum may, for example, undergo total internal reflection within the light expander 30. In this example, total internal reflection of the light beam occurs at the interface between the first side face 35 and air, and at the interface between the second side face 36 and air. FIGS. 1 and 2A illustrate a light ray 5 from the light continuum being reflected inside the light expander 30, to show schematically how the light continuum reflected.

In some alternative embodiments, the light continuum does not undergo total internal reflection inside the light expander 30. In these embodiments, the internal surfaces of the light expander 30 may be coated with a reflective material.

FIG. 2C illustrates an arrow 22 showing the direction in which the diverging light continuum, output by the optical engine 25, is input into the light expander 30. As the diverging light continuum is guided from the entrance face 33 towards the end face 34 of the light expander 30, the diverging upper and lower faces 32, 31 enable the diverging light continuum within the light expander 30 to expand, prior to the diverging light continuum exiting the light expander 30. FIG. 2C schematically illustrates a portion 300 of the diverging light continuum reflecting and expanding within the light expander 30. The diverging light continuum expands in a vertical dimension that is aligned with the lengths 21, 39 of the entrance and end faces 33, 34.

The light expander 30 is configured to output a diverging light continuum that has been vertically expanded relative to the light continuum that entered the light expander 30. The light expander 30 may cause little or no expansion of the light continuum in a horizontal dimension 38 that is substantially orthogonal to the vertical dimension 39. In FIG. 1, the vertical dimension is into and out of the page and the horizontal dimension is across the page.

In this example, the widths 38 of the entrance face 33 and the end face 34 are the substantially the same and the widths 23 of the upper and lower faces 32, 31, which extend between the entrance and end faces 33, 34, remain constant for the majority of the length of the upper and lower faces 32, 31. This prevents the light beam from expanding in a horizontal dimension aligned with the width 38 of entrance and end faces 33, 34.

After expanding the diverging light continuum, the light expander 30 provides the diverging light continuum to the optical device 50, which is positioned at a side face 36 of the light expander 30.

Figure 3:
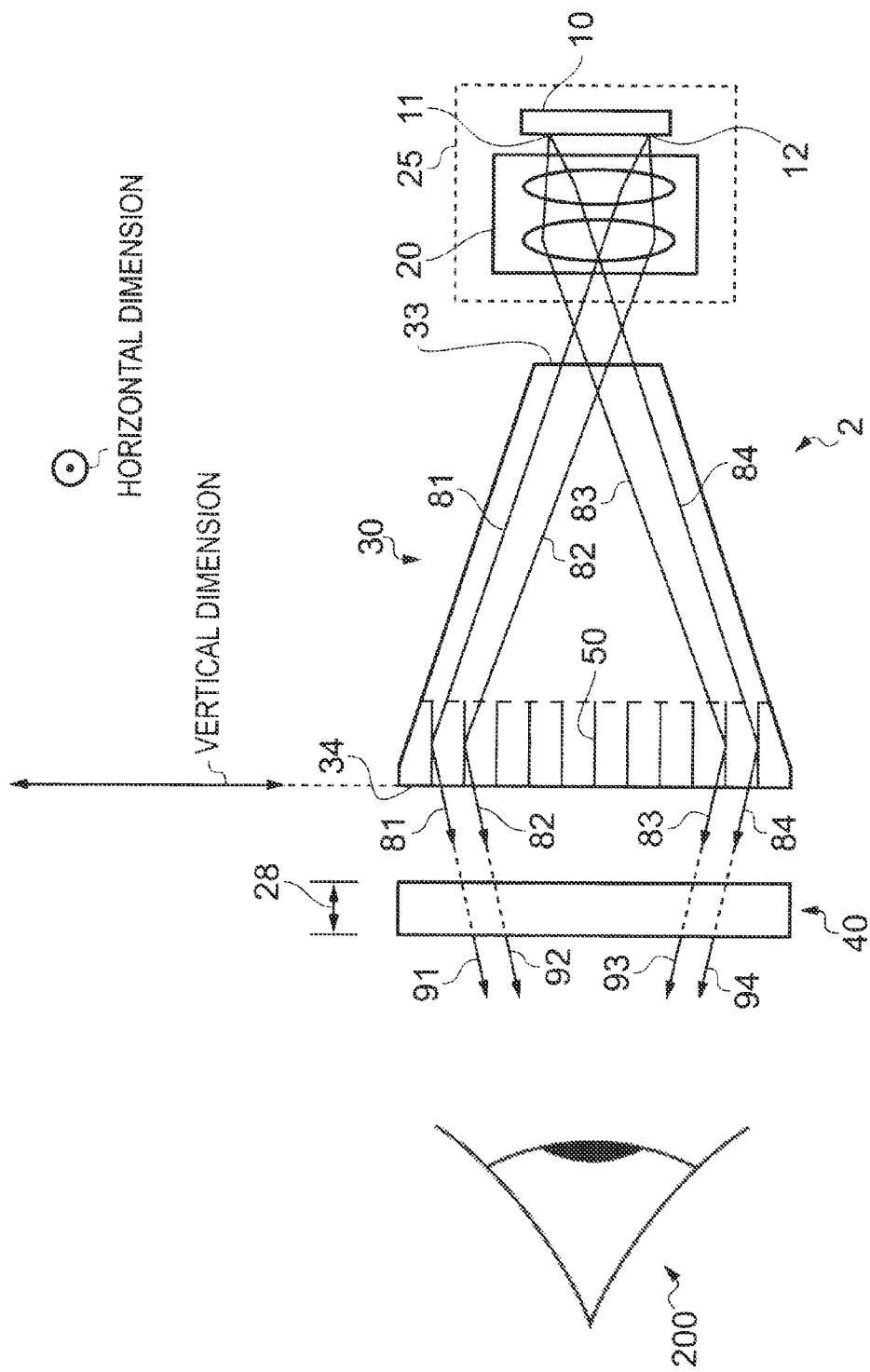
FIG. 3 illustrates a side view of the optical apparatus.

FIG. 3 illustrates how light rays from particular light beams of the light continuum travel through the light expander 30. FIG. 3 is a side view of the optical apparatus 2 illustrated in FIG. 1. The viewpoint illustrated in FIG. 3 is indicated by the arrow 125 shown in FIG. 1.

In FIG. 3, first and second light rays 81, 82 emanate from a first, lower, pixel 12 of the display 10 and third and fourth light rays 83, 84 emanate from a second, upper, pixel 11 of the display 10.

The first and second light rays 81, 82 can be considered to be part of a number of parallel light rays emanating from the first pixel 12 that form a first light beam. The third and fourth light rays 83, 84 can be considered to be part of a number of parallel light rays emanating from the second pixel 11 that form a first second light beam. The first light beam and the second light beam are portions of the continuum of light. As described above in relation to FIG. 1, each light beam has a diameter corresponding to the exit aperture of the optical engine.

The first and second light rays 81, 82 from the first light beam are parallel to one another as they travel out of the optical engine 25 and through the light expander 30. The first and second light rays 81, 82 (and the first light beam of which the light rays 81, 82 are a part) move upwards as they travel through the light expander 30. FIG. 3 schematically illustrates the first and second light rays 81, 82 being redirected by the optical device 50 before being output from an upper part of the end face 34 of the light expander 30.

The third and fourth light rays 83, 84 from the second light beam are parallel to one another as they travel out of the optical engine 25 and through the light expander 30. The third and fourth light rays 83, 84 (and the second light beam of which the light rays 83, 84 are a part) move downwards as they travel through the light expander 30. FIG. 3 schematically illustrates the third and fourth light rays 83, 84 being redirected by the optical device 50 before being output from a lower part of the end face 34 of the light expander 30.

Figure 4:
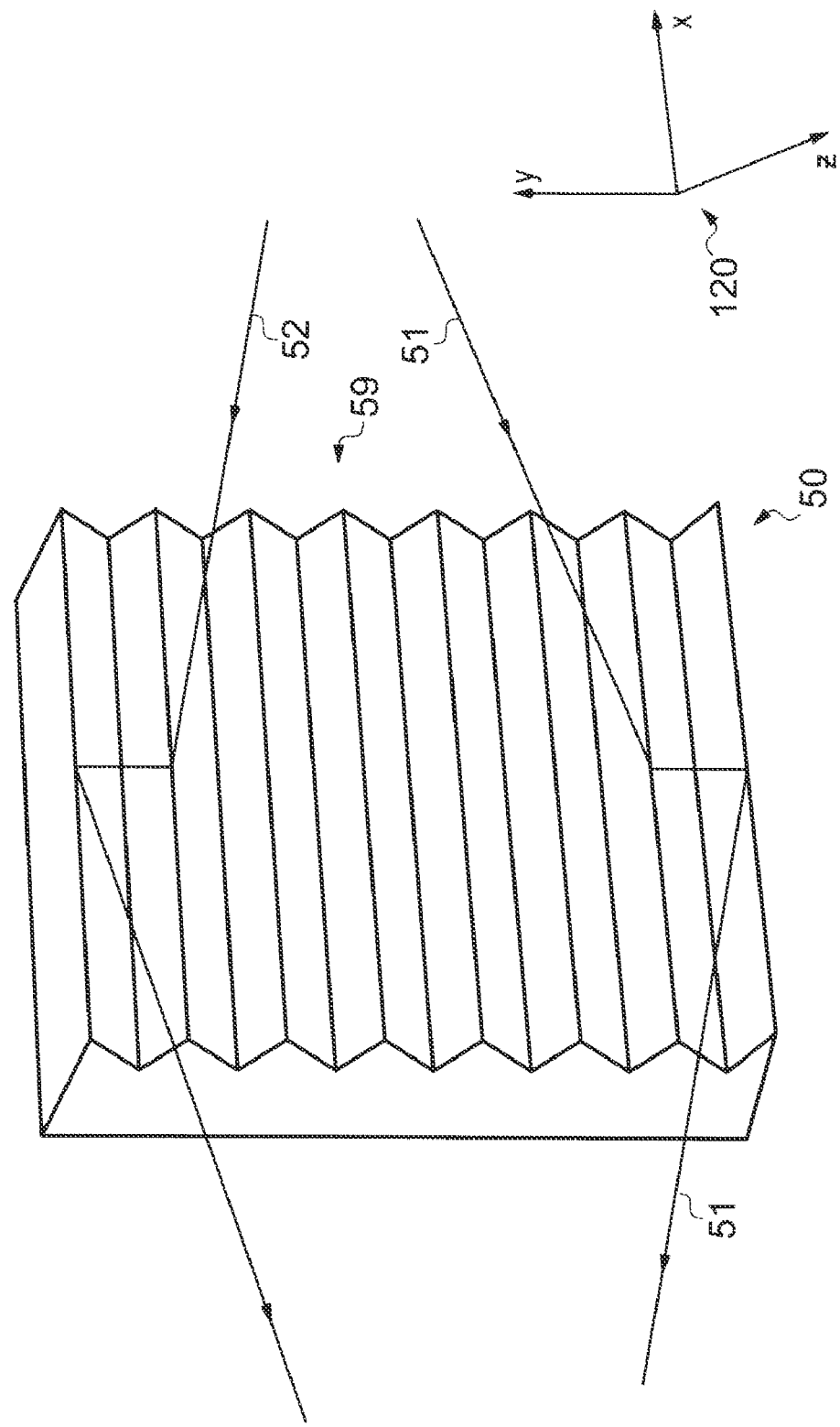
FIG. 4 illustrates a perspective view of an optical device.

FIGS. 4 and 5A to 5C illustrate the optical device 50. In this example, the optical device 50 is a grooved reflector that provides a reflective system. FIG. 4 illustrates a perspective view of the optical device 50. FIG. 5A illustrates an overhead view of the optical device 50 and FIGS. 5B and 5C illustrate side views of the optical device 50. FIG. 3 illustrates an overhead view of the optical device 50 that is similar to that shown in FIG. 5A.

The relative orientation of the optical device 50 in each of the figures is indicated by the x, y and z axes 120 in the figures. The y-axis illustrated in FIG. 5 and FIGS. 5A and 5C may, in this example, be considered to be substantially aligned with the vertical dimension mentioned above in relation to the expansion of light performed by the light expander 30 (and indicated in FIGS. 1 and 3).

The reflective system provided by the optical device 50 comprises a plurality of reflective surfaces 59. Adjacent reflective surfaces of the reflective system are substantially orthogonal to one another and provide alternating protrusions and recesses.

For example, FIG. 5C illustrates a first surface 55 that slopes inwardly and downwardly. An end of first surface 55 meets the beginning of a second surface 56 which slopes outwardly and downwardly. The first surface 55 and the second surface 56 are substantially orthogonal to one another and define a recess 57. The end of the second surface 56 meets the beginning of a third surface 58. The third surface 58 slopes inwardly and downwardly. The second surface 56 and the third surface 58 are substantially orthogonal to one another and define a protrusion.

The optical device 50 is configured to redirect the light continuum (and the light beams that make up the light continuum) that is incident upon it. FIG. 4 illustrates light rays 51, 52 from the light continuum being redirected in more detail than FIG. 3. In FIG. 4, each of the light rays 51, 52 reflect against a first reflective surface of the optical device 50 before reflecting against a second, adjacent reflective surface and being redirected away from the optical device 50.

When the diverging light continuum, provided by the light expander 30, is incident upon the optical device 50, the optical device 50 changes the direction of the light continuum in the vertical dimension (y) to produce a converging light continuum. This is illustrated schematically in FIG. 4, which illustrates the y-component of incident light rays 51, 52 being inverted by the optical device 50.

The optical device 50 is also configured to change the direction of an incident light continuum within a plane that is orthogonal to the vertical dimension. It can be seen from FIG. 5A that the light rays 51, 52 are redirected within a plane that is defined by the x and z axes, and orthogonal to the y-axis.

The optical device 50 redirects a diverging light continuum, received from the light expander 30, to produce a converging light continuum that converges in the vertical dimension (y). This can be seen schematically in FIG. 3, which illustrates light rays 81, 82, 83, 84 from the light continuum being redirected to produce converging light.

The converging light continuum output by the optical device 50 travels through the light expander 30, out of the end face 34 of the light expander 30 and towards the second light expander 40. In this example, the second light expander is an exit pupil expander 40. The exit pupil expander 40 is illustrated in FIGS. 6A and 6B.

Figure 6A:
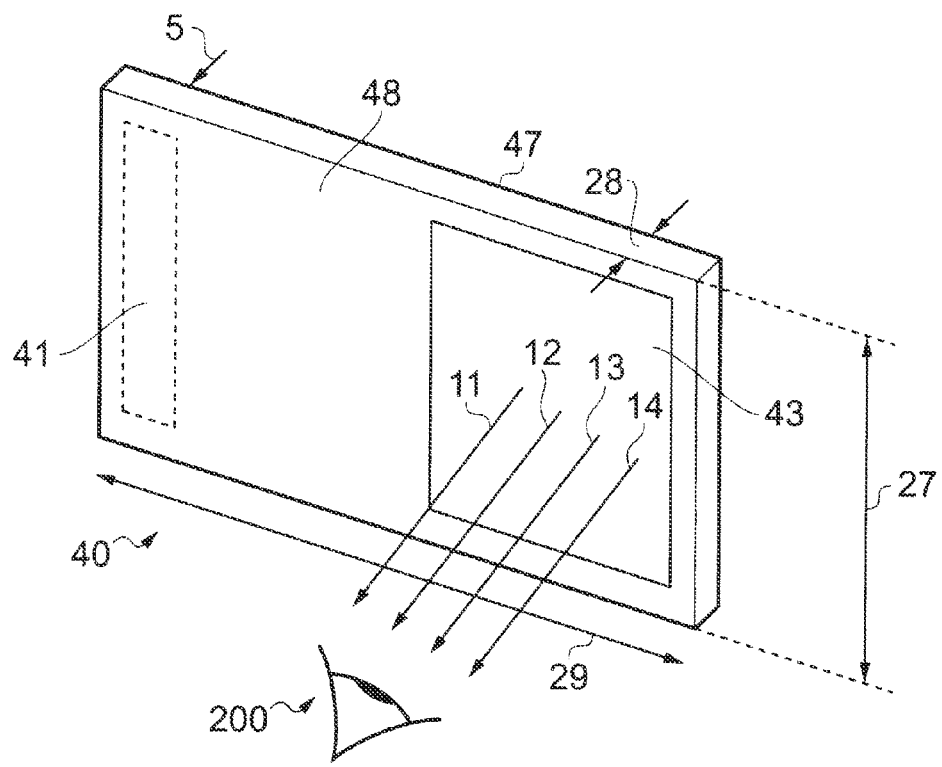
FIG. 6A illustrates a perspective view of an exit pupil expander.
Figure 6B:
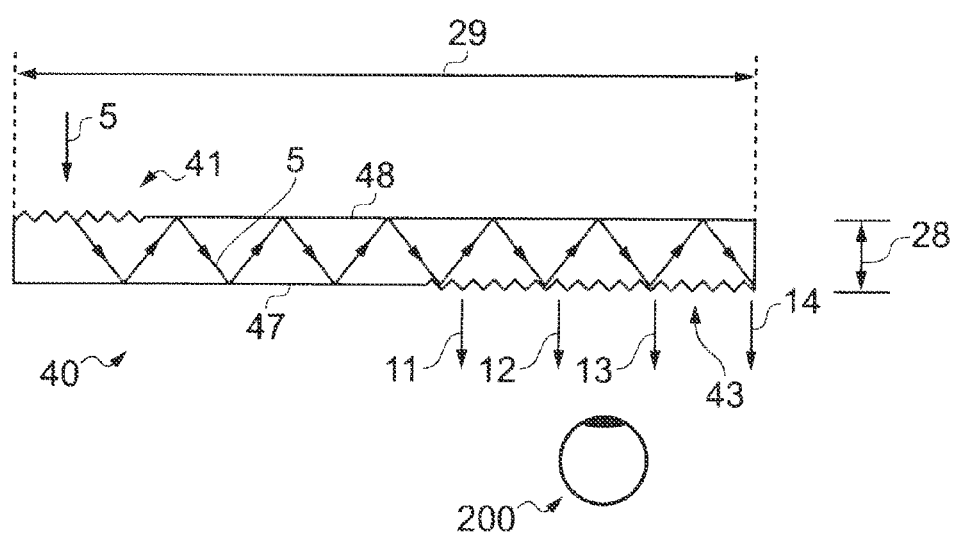
FIG. 6B illustrates a cross-section of the exit pupil expander.

FIG. 6A is a perspective view of the exit pupil expander 40 and FIG. 6B illustrates a cross section of the exit pupil expander 40. The exit pupil expander 40 has a length 29, a width 27 and a depth 28.

The exit pupil expander 40 illustrated in FIGS. 6A and 6B comprises an in-coupling portion 41 and an out-coupling portion 43. In this example, the first out-coupling portion 41 is a first diffraction grating and the out-coupling portion 43 is a second diffraction grating. In other examples, the in-coupling portion 41 and/or the out-coupling portion 43 may be provided by refractive and/or reflective optics.

In the exemplary exit pupil expander 40 illustrated in FIGS. 6A and 6B, the first diffraction grating 41 is situated on a rear face 47 of the exit pupil expander 40 and the second diffraction grating 43 is situated on a front face 48 of the exit pupil expander 40.

The light continuum enters the exit pupil expander 40 via the first diffraction grating 41. After entry into the exit pupil expander 40, the light beam undergoes total internal reflection inside the exit pupil expander 40. The light continuum is guided along the length 29 of the exit pupil expander 40 before leaving via the second diffraction grating 43. When light from the light continuum is incident upon the second diffraction grating 43 from within the exit pupil expander 40, a portion of the light leaves the exit pupil expander 40 via the second diffraction grating 43 and the remainder of the light is reflected from the second diffraction grating 43, inside the exit pupil expander 40.

The light continuum may be reflected by the second diffraction grating 43 a number of times in succession. This results in the light continuum leaving the exit pupil expander 43 effectively being a horizontally expanded version of the light continuum originally incident upon the first diffraction grating 41. In this example, the direction of expansion is aligned with the length 29 of the exit pupil expander 29.

FIG. 6B schematically illustrates a light ray 5 from the light continuum entering the exit pupil expander 40 and being reflected inside the exit pupil expander 40. The light rays 11-14 schematically illustrate a horizontally expanded light continuum exiting the exit pupil expander 40.

The exit pupil expander 40 may be configured not to expand the light beam output by the optical device 50 in the vertical dimension (substantially aligned with the width 27 of the exit pupil expander 40).

The exit pupil expander 40 may be configured to expand the light continuum that is incident upon it by the same magnitude as the expansion of the light continuum that results from the functions performed by the light expander 30 and the optical device 50.

The light expander 30 can be considered to expand the exit pupil of the optical apparatus 2 vertically. The exit pupil expander 40 can be considered to expand the exit pupil of the optical apparatus 2 horizontally. The horizontal and vertical extent of the exit pupil of the optical apparatus 2 may, for example, be larger than the diameter of the entrance pupil of the eye.

FIG. 3 illustrates a side view of the exit pupil expander 40. FIG. 3 schematically illustrates a converging light continuum (represented, in this case, by the light rays 81-84) being input into the exit pupil expander 40 via the first diffraction grating 41 of the exit pupil expander 40.

The converging light continuum beam represented by the light rays 81-84 has been expanded in a vertical sense (as compared to the state of the light continuum when it is output by the optical engine 25). In this example, the converging light continuum represented by the light rays 81-84 has not been expanded in a horizontal sense (as compared to the state of the light continuum when it is output by the optical engine 25).

The angle at which a light ray enters the first diffraction grating 41 of the exit pupil expander 40 is the same angle at which that light ray exits the exit pupil expander 40 at the second diffraction grating 43. This means that inputting a converging, expanded light continuum into the exit pupil expander 40 results in a converging, expanded light continuum being output by the exit pupil expander 40.

In this particular example, the light continuum that is input into the exit pupil expander 40 converges in the vertical dimension (as illustrated in FIG. 3) but not in the horizontal dimension. The light continuum that is output by the exit pupil expander 40 also converges in the vertical dimension (as illustrated in FIG. 3) but not in the horizontal dimension (as illustrated in FIGS. 1, 6A and 6B, for example).

FIG. 3 schematically illustrates converging light rays 91-94, which are part of the converging light continuum that is output by the second diffraction grating 43 of the exit pupil expander 40 and which may be used by a user 200 to view an image on a virtual display. The converging light continuum represented by the light rays 91-94 has been expanded in a vertical sense and in a horizontal sense (as compared to the state of the light continuum when it is output by the optical engine 25).

Figure 7:
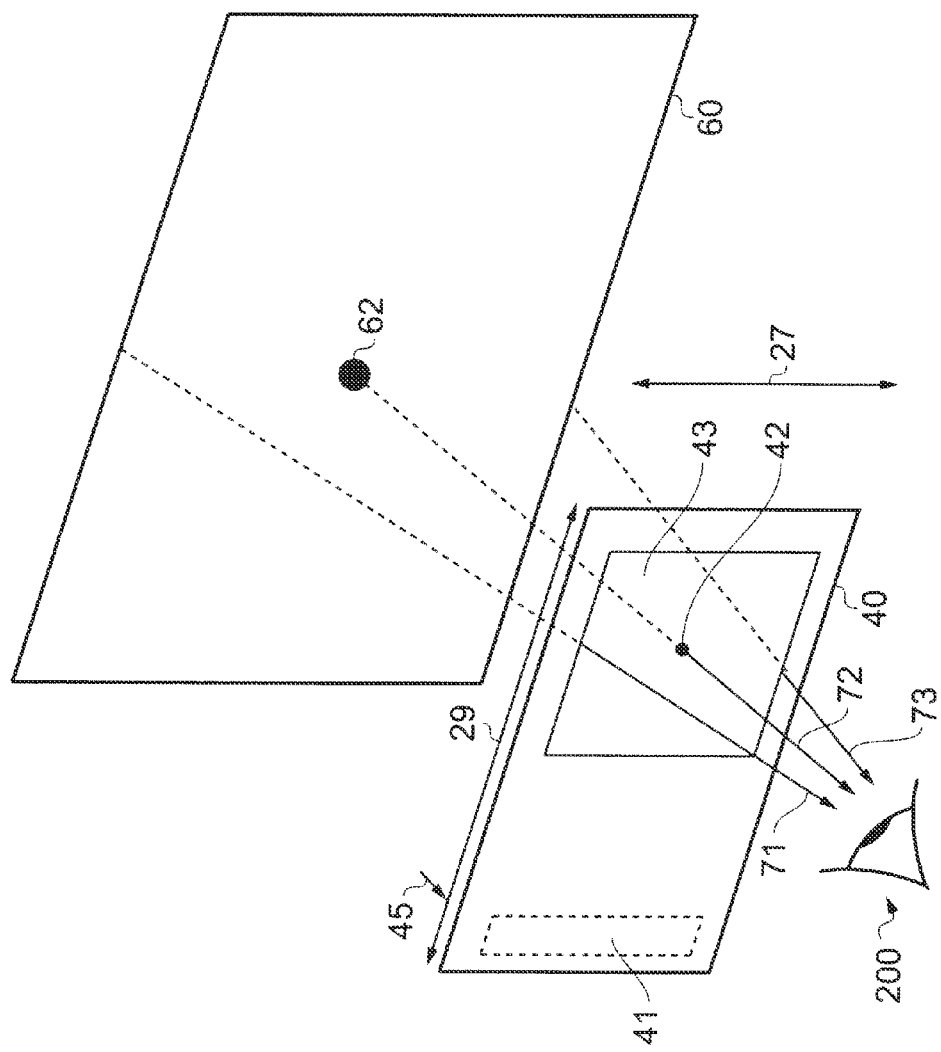
FIG. 7 illustrates a perspective view of a user viewing a virtual display through an exit pupil expander.
Figure 8:
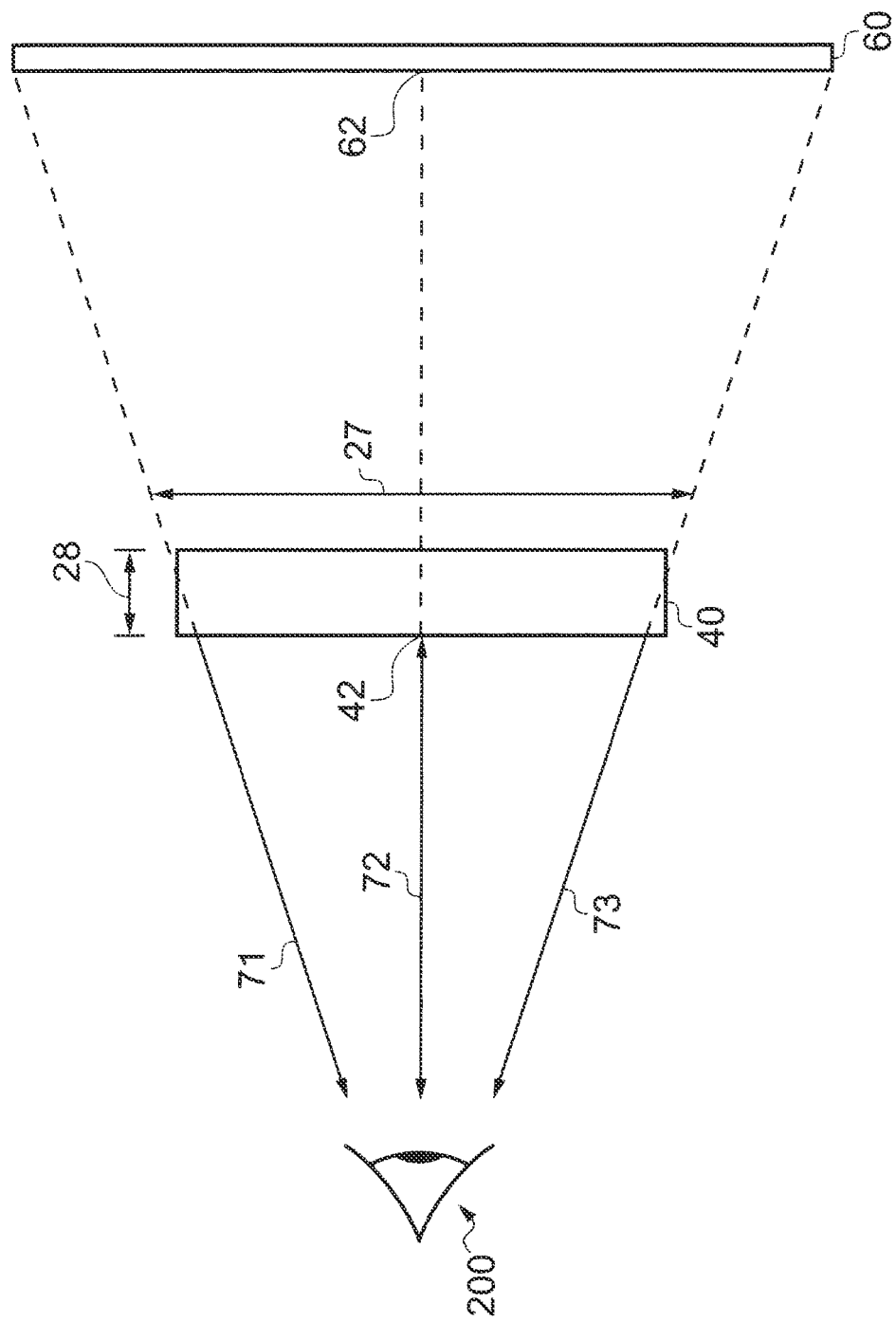
FIG. 8 illustrates a side view of the user viewing the virtual display through the exit pupil expander.

The exit pupil expander 40 provides an exit pupil for the optical apparatus 2 that enables a user to view an enlarged version of an image displayed on the display 10. FIG. 7 illustrates a perspective view of a user 200 viewing an enlarged image on a virtual display 60. FIG. 8 illustrates a side view of the user 200 viewing the expanded image on the virtual display 60.

In FIGS. 7 and 8, the gaze point 42 of the user is at the center of the exit pupil expander 40. When gazing at the central gaze point 42, the user 200 may see the whole of the virtual display 60 (the whole of the image displayed on the display 10). The gaze point on the virtual display has been assigned reference numeral 62 in FIGS. 7 and 8.

Figure 9:
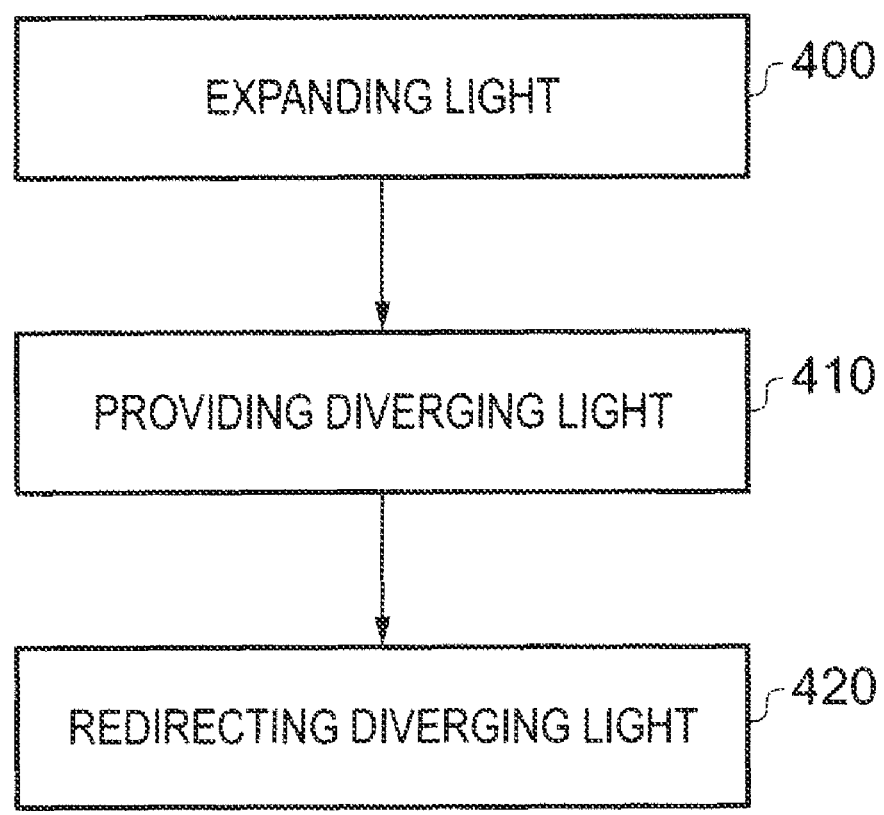
FIG. 9 illustrates a method.

At the user's viewing position, the light rays exiting the exit pupil expander 40 converge on the user's eye. Light rays exiting an upper portion of the second diffraction grating 43, such as light ray 71, travel downwardly towards the user's eye. Light rays exiting a lower portion of the second diffraction grating 43, such as light ray 73, travel upwardly towards the user's eye. In FIGS. 8 and 9, the light rays 71, 72 and 73 have been extrapolated to illustrate how they relate to the virtual display 60.

In the exemplary embodiments described above, light is expanded in vertical and horizontal dimensions by light expanders 30, 40, enabling a user to view an image on a virtual display 60 comfortably. Many of the light rays exiting the optical apparatus 2 are used by the user to view the virtual display 60, because the light beam exiting the exit pupil expander 40 converges towards the user's eye(s).

Relatively few light rays exit the exit pupil expander 40 without being used by the user to view the virtual display 60. For example, in the disclosed embodiments, relatively few light rays are directed upwardly from the upper portion of the exit pupil expander 40 (and away from the eye). Similarly, relatively few light rays are directly downwardly from the lower portion of the exit pupil expander 40 (and away from the eye).

Since relatively little light is wasted, the disclosed embodiments advantageously enable power to be conserved. Power need not be wasted outputting light to the exit pupil expander 40 that the exit pupil expander 40 subsequently directs away from the user's eye (and consequently is not used by the user 200 to view the virtual display 60).

The disclosed embodiments are also advantageous because the optical apparatus 2 may be made relatively compact, making it suitable for use in a portable electronic device.

FIG. 9 illustrates a flow chart of a method. At block 400, the light expander 30 expands light, input into the light expander 30, in a first, vertical, dimension. At block 410, the light expander 30 provides diverging light (which diverges in the vertical dimension) to the optical device 50. At block 420, the optical device redirects the diverging light, provided by the light expander 30, to produce converging light that converges in the vertical dimension.

The illustration of a particular order to the blocks in FIG. 9 does not necessarily imply that there is a required or preferred order for the blocks and the order and arrangement of the block may be varied. Furthermore, it may be possible for some steps to be omitted.

Although the disclosed embodiments have been described in the preceding paragraphs with reference to various examples, it should be appreciated that modifications to the examples given can be made without departing from the scope of the disclosed embodiments as claimed. For example, the exit pupil expander 40 is illustrated in the figures as having two diffraction gratings 41, 43. However, the exit pupil expander 40 may have any number of diffraction gratings. Also, those diffraction gratings may or may not be on different faces 47, 48 of the exit pupil expander 40.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the disclosed embodiments believed to be of particular importance it should be understood that the Applicant claims protection in respect of any patentable feature or combination of features hereinbefore referred to and/or shown in the drawings whether or not particular emphasis has been placed thereon.

What is claimed is:

1. An apparatus, comprising:
    a light expander configured to expand light, input into the light expander, in a first dimension, and configured to provide diverging light that diverges in the first dimension;
    an optical device configured to redirect diverging light, received from the light expander, to produce converging light that converges in the first dimension; and
    a further light expander configured to expand the light, converging in the first dimension and received from the optical device, in a second dimension substantially orthogonal to the first dimension.

2. An apparatus as claimed in claim 1, wherein the light expander is configured to guide light, input into the light expander, prior to providing diverging light to the optical device.

3. An apparatus as claimed in claim 1, wherein the light expander is configured to expand light, input into the light expander, in the first dimension and not in a second dimension, the second dimension being substantially orthogonal to the first dimension.

4. An apparatus as claimed in claim 1, wherein the optical device is configured to redirect diverging light, received from the light expander, to produce converging light that converges in the first dimension and not in a second dimension, the second dimension being substantially orthogonal to the first dimension, 5. An apparatus as claimed in claim 1, wherein the optical device is configured to redirect the diverging light within a plane substantially orthogonal to the first dimension.

6. An apparatus as claimed in claim 1, wherein the optical device comprises a reflecting system comprising a plurality of reflecting surfaces.

7. An apparatus as claimed in claim 6, wherein adjacent reflecting surfaces of the reflecting system are orthogonal to one another.

8. An apparatus as claimed in claim 6, wherein the reflecting system is provided by a grooved reflector.

9. An apparatus as claimed in claim 1, wherein the light input into the light expander represents an image displayed on a display.

10. An apparatus as claimed in claim 1, wherein the further light expander comprises an in-coupling portion configured to receive the converging light from the optical device, and an out-coupling portion configured to output light to a user.

11. An apparatus as claimed in claim 10, wherein the in-coupling portion of the further light expander comprises a first grating and the out-coupling portion of the further light expander comprises a second grating.

12. An apparatus as claimed in claim 1, wherein the further light expander provides an exit pupil for the apparatus.

13. A method, comprising:
expanding light in a first dimension;
providing diverging light, that diverges in the first dimension;
redirecting the diverging light to produce converging light that converges in the first dimension; and
expanding the converging light in a second dimension, substantially orthogonal to the first dimension.

14. A method as claimed in claim 13, wherein the light is expanded in the first dimension and not in a second dimension, the second dimension being substantially orthogonal to the first dimension.

15. A method as claimed in claim 13, wherein the diverging light is redirected to produce converging light that converges in the first dimension and not in a second dimension, the second dimension being substantially orthogonal to the first dimension.

16. An apparatus, comprising:
light expanding means for expanding light, in a first dimension, and for providing diverging light that diverges in the first dimension; and
redirecting means for redirecting diverging light, received from the light expanding means, to produce converging light that converges in the first dimension; and
further light expanding means for expanding the light, converging in the first dimension and received from the redirecting means, in a second dimension substantially orthogonal to the first dimension.

17. An apparatus as claimed in claim 16, wherein the light expanding means is for expanding light, input into the light expander, in the first dimension and not in a second dimension, the second dimension being substantially orthogonal to the first dimension.

18. An apparatus as claimed in claim 16, wherein the redirecting means is for redirecting diverging light, received from the light expander, to produce converging light that converges in the first dimension and not in a second dimension, the second dimension being substantially orthogonal to the first dimension.

19. An apparatus, comprising:
a light expander configured to expand light, input into the light expander, in a first dimension, and configured to provide diverging light that diverges in the first dimension; and
a grooved reflector configured to redirect diverging light, received from the light expander, to produce converging light that converges in the first dimension.

* * * * *